(12) United States Patent
Pachet et al.

(10) Patent No.: US 8,838,260 B2
(45) Date of Patent: Sep. 16, 2014

(54) ANIMAL-MACHINE AUDIO INTERACTION SYSTEM

(75) Inventors: François Pachet, Paris (FR); Pierre Roy, Paris (FR)

(73) Assignee: Sony Corporation, Tokyo (JP)

( * ) Notice: Subject to any disclaimer, the term of this patent is extended or adjusted under 35 U.S.C. 154(b) by 1020 days.

(21) Appl. No.: 12/896,175

(22) Filed: Oct. 1, 2010

(65) Prior Publication Data

US 2011/0082574 A1 Apr. 7, 2011

(30) Foreign Application Priority Data

Oct. 7, 2009 (EP) .................................... 09305951

(51) Int. Cl.
G06F 17/00 (2006.01)
A01K 15/02 (2006.01)
A01K 29/00 (2006.01)
G10L 17/26 (2013.01)

(52) U.S. Cl.
CPC ............... *A01K 29/005* (2013.01); *A01K 15/02* (2013.01); *A01K 15/025* (2013.01); *G10L 17/26* (2013.01)
USPC ......................................................... 700/94

(58) Field of Classification Search
CPC ........ G10L 17/26; G09B 23/36; A01K 29/00; A01K 15/021; A01K 29/005
See application file for complete search history.

(56) References Cited

U.S. PATENT DOCUMENTS

| | | | |
|---|---|---|---|
| 5,749,324 A * | 5/1998 | Moore | 119/719 |
| 5,956,463 A * | 9/1999 | Patrick et al. | 704/232 |
| 6,178,923 B1 * | 1/2001 | Plotkin | 119/719 |
| 6,535,131 B1 * | 3/2003 | Bar-Shalom et al. | 340/573.1 |
| 6,761,131 B2 * | 7/2004 | Suzuki | 119/174 |
| 7,350,481 B2 * | 4/2008 | Bar-Shalom | 119/859 |
| 7,377,233 B2 * | 5/2008 | Patton | 119/712 |
| 7,963,254 B2 * | 6/2011 | Patton | 119/712 |

(Continued)

FOREIGN PATENT DOCUMENTS

| | | |
|---|---|---|
| JP | 02-093861 A | 4/1990 |
| JP | 2004-191872 A | 7/2004 |

(Continued)

OTHER PUBLICATIONS

Office Action issued Jan. 7, 2014 in Japanese Patent Application No. 2010-227888 (with English language translation).

(Continued)

*Primary Examiner* — Andrew C Flanders
(74) *Attorney, Agent, or Firm* — Oblon, Spivak, McClelland, Maier & Neustadt, L.L.P.

(57) ABSTRACT

An animal-machine audio interaction system includes a sound monitor for monitoring the sounds made by one or more animals, a sound segmenter for identifying coherent sound segments within the sounds made by the animal(s), a sound analyzer for analyzing and assigning a category to each sound segment, an output sound selector for selecting an output sound appropriate to the category assigned by the sound analyzer, and a sound output unit for outputting the selected output sound to the animal(s). A different control protocol may be used to define the categories assigned to the animal sounds and to determine the respective audio responses that are appropriate to the different sound categories. During operation of the system, a closed-loop audio interaction is set up between the animal(s) and the system. This interaction may be used for various purposes, such as investigating animal behavior, entertaining the animal(s) and controlling animal behavior.

15 Claims, 3 Drawing Sheets

(56) References Cited

U.S. PATENT DOCUMENTS

| | | | |
|---|---|---|---|
| 2004/0083106 A1* | 4/2004 | Rines | 704/270 |
| 2004/0088164 A1* | 5/2004 | Perlo et al. | 704/259 |
| 2004/0107104 A1* | 6/2004 | Schaphorst | 704/270 |
| 2005/0049877 A1* | 3/2005 | Agranat | 704/270 |
| 2005/0154592 A1* | 7/2005 | Perlo | 704/275 |

FOREIGN PATENT DOCUMENTS

| | | |
|---|---|---|
| JP | 2004-212544 A | 7/2004 |
| JP | 2008-061640 A | 3/2008 |
| WO | WO 03/015076 A1 | 2/2003 |

OTHER PUBLICATIONS

Csaba Molnár, et al., "Classification of dog barks: a machine learning approach", Anim Cogn, DOI 10.1007/s10071-007-0129-9, 12 pages, Copyright 2008.

Michael Kremliovsky, et al., "Characterization of Dolphin Acoustic Echo-Locatio Data Using a Dynamical Classification Method", International Journal of Bifurcation and Chaos, vol. 8, No. 4, 1998, pp. 813-823.

* cited by examiner

FIG.3A
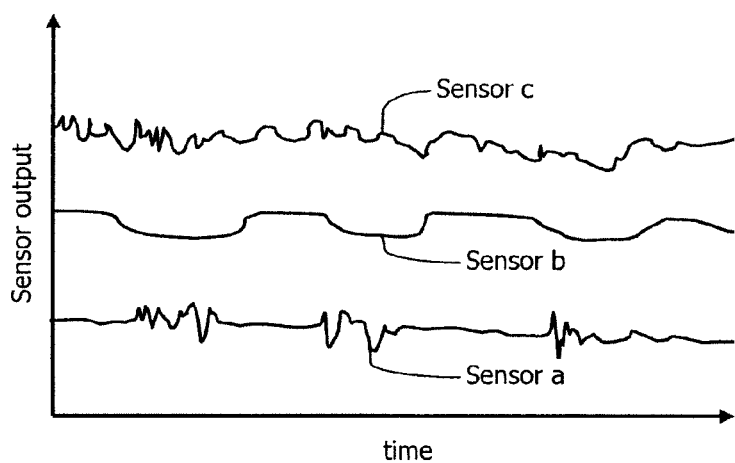
FIG.3B
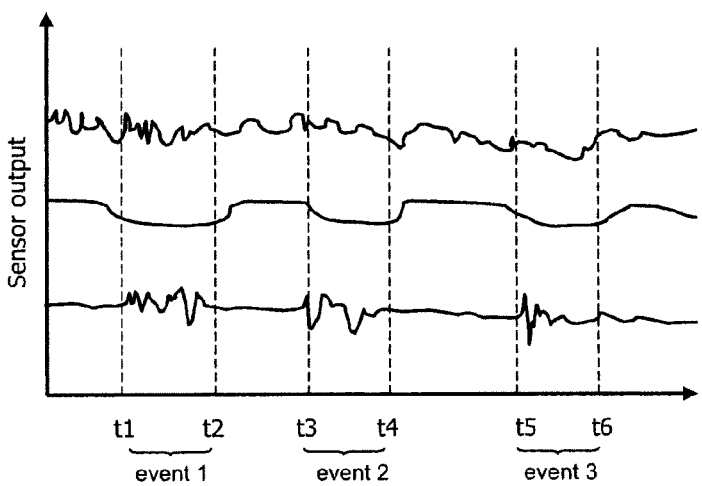
FIG.3C
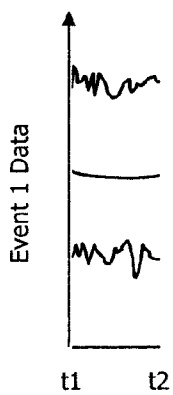
FIG.3D
| Event ID | Sa Segment | Sb Segment | Sc Segment |
|---|---|---|---|
| | | | |

ANIMAL-MACHINE AUDIO INTERACTION SYSTEM

FIELD OF THE INVENTION

The present invention relates to an audio interaction system configured to produce audio interaction between one or more animals and a machine (typically, a computer system).

BACKGROUND INFORMATION

Animals make a wide variety of sounds, which include vocalizations—bird calls, dog barks, etc.—but also other sounds, for example sounds made using body parts other than vocal chords and sounds produced when the animal is engaged in some activity (e.g. knocking with a beak, eating, digging, etc.).

Ethologists, farmers, zoo keepers, pet owners, and the like have long known that many animal sounds are meaningful and relate to the animal's behaviour, situation, state of mind and/or identity (gender, age, size and, also, individual identity). Numerous different experiments have now shown that there can be a relationship between an animal's behavioural context (situation/motivational state) and/or identity and measurable acoustic properties of sounds that the animal makes.

Experiments have shown that the acoustic properties of vocalizations produced by birds, various mammals (primates, deer, dogs, elephants, . . . ), anurans and other land-and sea-based animals can vary dependent on the behavioural context (desire to mate, presence of a predator, etc.) and/or on the size, gender and age of the animals (this latter property making it possible, in some cases, to recognize an individual animal based on its vocalizations).

For example, in relation to the effect of behavioural context, the Centre for Mammal Vocal Communication Research at the University of Sussex has recently found that domestic cats can produce a particular type of purr, including an embedded high-frequency component (similar to a human baby's cry), when they are trying to solicit attention or food from their owners. Moreover, the present inventors were part of a research team which analyzed barks made by Hungarian sheepdogs in seven different behavioural contexts and found that a machine-based acoustic analysis of the barks could often successfully determine the behavioural context in which a particular bark was produced (see "Classification of dog barks: a machine learning approach" by Molnar et al, published in Animal Cognition, 11(3), pages 389-400, Springer Verlag, 2008).

In addition to these "meaningful vocalizations", some of the other sounds made by animals, either deliberately or incidentally as they go about their daily lives, can be interesting because they can help to indicate what is the animal's current behaviour, state of mind, etc.

Animals also react to sounds that they hear, notably by changing the nature or intensity of their behaviour. For example, if a domestic animal is hungry and hears the sound of its owner approaching, it may move to stand by its feeding dish. As another example, if a domestic or zoo animal is frightened and then it hears the voice of a human it knows well, it may calm down. As yet another example, seals are known to behave differently depending on whether sounds they hear from an approaching whale are sounds made by a killer whale (predator) or sounds made by another, non-predator species.

In some experiments, ethologists play synthesized or recorded animal calls to one or more animals in order to observe how these animals will react to the sounds. However, these experiments are essentially manual processes, using machinery merely for the generation and outputting of sounds and recording of animal audio responses. Moreover, these experiments can be described as "one-shot" processes, investigating the immediate effect that a given sound produces on animal behaviour. Furthermore, in these experiments the animals are reacting to human stimulus, the tests do not examine interactions where the animal creates the initial stimulus.

SUMMARY OF THE INVENTION

The present inventors have conceived an animal-machine audio interaction system which monitors and analyzes sounds made by one or more animals (and, optionally, other parameters that may be indicative of animal behaviour, situation, state of mind and/or identity) and automatically produces an audio response which may, in turn, prompt another sound/behaviour from the animal, and so on.

More particularly, the present invention provides an animal-machine audio interaction system according to claim 1 annexed hereto.

The present invention further provides a method of controlling audio interaction between one or more animals and a machine, according to claim 9 annexed hereto.

The present invention yet further provides a computer program according to claim 15 annexed hereto.

In preferred embodiments of the invention the animal-machine audio interaction system includes an audio sensor and, optionally, other sensors detecting parameters which can help indicate the animal's behaviour, situation, state of mind and/or identity, monitors the outputs from the set of sensors and analyzes these outputs in order to detect, within the sensor-signal streams, individual sound events which correspond to the animal producing/causing a sound having a particular character (or more generally, when multiple different types of sensor are used, to detect "events" which correspond to the animal engaging in some particular behaviour/activity, being in a particular state of mind, being in a particular situation, or the like).

In preferred embodiments of the invention the animal-machine audio interaction system seeks to classify each detected event (e.g. sound, behaviour, activity, etc.) by determining whether or not its properties match certain pre-defined categories which, typically, correspond to events the system has encountered during a preliminary training phase. This classification is performed by analyzing the sensor data corresponding to an individual detected "event" in order to generate a set of "features" characterizing the event and comparing this feature set with stored feature set data (e.g. derived during the training phase) which define "categories" that characterize different animal behaviours, moods, situations, activities, etc. If the feature set of a detected event is similar to the feature set characterizing a particular predefined category, the detected event is classified in that predefined category. This may well mean that the animal is engaged in the same kind of activity (making the same kind of vocalization, etc.) as it was during a training phase when this category's feature set data was obtained and/or that the animal whose sound has been detected is the same individual (or gender, age, etc.) as one whose sounds were analyzed during a training phase.

In preferred embodiments of the invention the animal-machine audio interaction system automatically selects a sound to be output back to the animal, and the choice takes into account the category in which one or more detected events has been classified.

Depending on the application of the system, a different control protocol may be used:
- to define the categories assigned to the detected animal sounds (behaviours, events), and
- to determine what audio output will be made in different circumstances (taking into account the categories assigned to detected events).

The control protocol may define a simple "response" mode, in which the sound output in response to a given event depends directly on the category assigned to that event (according to a predetermined mapping function). A more complicated "response-type" control protocol may select the output sound in dependence on the sequence of categories assigned to a specified number of prior detected events (usually the current detected event constitutes the last event in the sequence).

Some control protocols define specific scenarios including multiple different operating states or "modes" of the system. For example, in one application where the invention was applied to study the calling behaviour of canaries, a control protocol was used in which, as long as the canaries were producing sounds in a manner that was not coherent, the system operated in a "trigger" mode, (in which, once every four seconds, a sound was selected at random from a database of recorded canary calls and played back), followed by a "dialogue" mode in which a one-to-one interaction was set up (and maintained by the system for a predetermined time or until a preset condition was fulfilled, e.g. the frequency of emission of the canary calls reduced by a specified amount).

Implementation of a given control protocol generally involves analysing one or more inputs (notably, the categories that the analysis module assigns to events) in order to determine what should be the appropriate output. In general, the category assigned to the current event will have some effect on the system's audio output. The analysis of inputs may involve use of a state machine, which can be implemented using any desired technology (for example, probabilistic automata, Markov techniques, etc.). Selection of the output can be achieved using any appropriate technique: in a simple case it may be appropriate to use a look-up table whereas, in a complex case, it may be appropriate to use a sequence generator (which may be a sequence generator which takes into account the history of some or all of the interactions in the current session).

During operation of the system, a closed-loop audio interaction is set up between the animal(s) and the system. Through appropriate choice of the system's control protocol, this interaction may be used for various purposes.

Notably, the animal-machine audio interaction system according to the invention has numerous applications: for example, it may be used by ethologists as a scientific tool for investigating animal behaviour, it may be implemented as a type of animal entertainment system (for example, an entertainment system which engages in a kind of "conversation" with the animal), it may be implemented as a system for controlling animal behaviour (e.g. to pacify an anxious animal, to direct an animal to a particular location), and many more applications are possible.

The animal-machine audio interaction system according to the present invention is an automatic system. Once set up, this system can be left to operate, substantially without human intervention, i.e. it is an automatic, closed-loop, audio-based interaction system.

Furthermore, the animal-machine audio interaction system according to the present invention is capable of causing a sustained interaction, rather like a conversation, between an animal (or a group of animals) and a machine, not just a one-off stimulus and response.

Moreover, the animal-machine audio interaction system according to the present invention can engage in interactions that are triggered by some sound, behaviour or action by an animal, not initiated by a human experimenter. This can lead to systems having new functionalities that have not been seen before. Moreover, even in applications that involve investigation of animal behaviour, the fact that the interaction may be triggered by the animal, rather than the experimenter, can reveal features of animal behaviour that have not been susceptible of systematic investigation before.

BRIEF DESCRIPTION OF THE DRAWINGS

Further features and advantages of the present invention will become apparent from the following description of certain currently-preferred embodiments thereof, given by way of illustration and not limitation, in association with the accompanying drawings, in which:

FIG. 3 illustrates how sensor output signals may be segmented to detect "events", in which:
FIG. 3A illustrates output signals from 3 sensors over a common time interval,
and
 FIG. 3B illustrates how the sensor signals of FIG. 3A may be segmented to identify events to be classified,
FIG. 3C is an example of analogue data corresponding to event 1 in FIG. 3B,
and
 FIG. 3D is an example of digital data corresponding to event 1 in FIG. 3B;
and FIG. 4 illustrates some examples of different physical implementations of the animal-machine audio interaction system according to the invention, in which.

DETAILED DESCRIPTION

As indicated above, the present inventors have developed an automatic system which interacts with animals by sensing animal sounds (and, optionally, other parameters) and making an audio response, determining the choice of response sound to output to the animal based on a control protocol and on an automatic classification of the sounds (and, optionally, other cues) provided by the animal.

Figure 1:
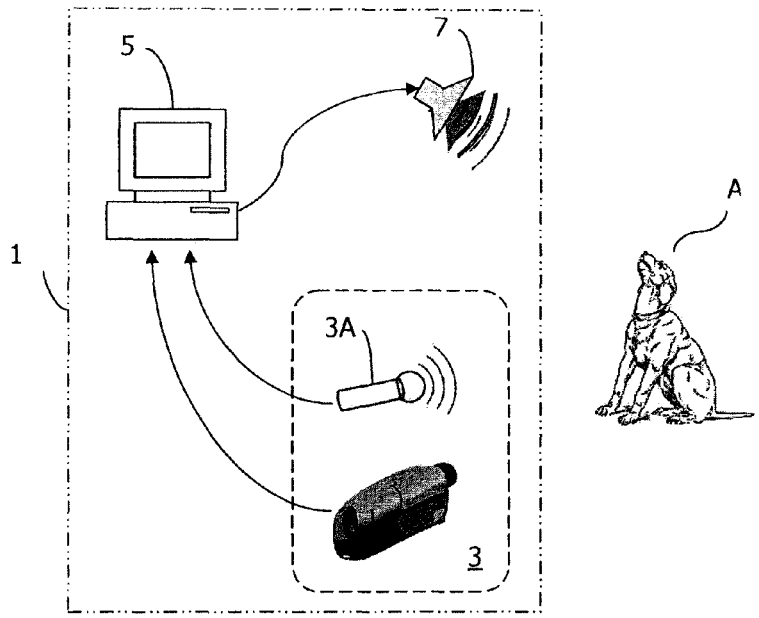
FIG. 1 is a diagram illustrating, schematically, the main types of device used in one embodiment of animal-machine audio interaction system according to the present invention.

The main components of the machine-animal audio interaction system according to one embodiment of the present invention are illustrated schematically in FIG. 1. As shown in FIG. 1, the machine-animal audio interaction system 1 of the present embodiment includes a set of one or more sensors 3, including an audio sensor 3A, arranged to detect sounds (or other parameters) from one or more animals A, a computer system 5 arranged to receive and process the output signals from the set of sensors 3 and to generate an audio response based on a predetermined control protocol, and a sound output device 7 for playing the selected audio response to the animal(s) A.

As indicated above, the set of sensors comprises at least a sound sensor 3A, which can be any convenient kind of sound transducer suited to the animal's environment (e.g. a microphone, a hydrophone) and suited to the expected properties (e.g. pitch) of the animal sounds. The set of sensors may also include sensors of other kinds, depending on the system's application. Such "other sensors" may include image capture devices such as still or video cameras (e.g. providing information regarding animal behaviour via scene analysis/motion detection techniques), physiological sensors (e.g. pheromone detectors; sensors measuring the animal's heart rate, blood pressure, body temperature, etc.; sensors, such as devices generating EEGs or functional MRI scans, which monitor brain activity; etc.), movement sensors (e.g. microwave and passive infrared devices that detect movement wirelessly; sensors linked to devices—hamster wheels and the like—which are operable by the animal; sensors monitoring chips, RFID tags and the like worn by or implanted in the animal; etc.), activity monitors (e.g. accelerometers carried by the animal and counting the number of steps taken), sensors monitoring feeding and drinking, and so on—including new types of sensor developed in the future.

In some applications, the sensors may also include devices which measure properties of the environment, such as light levels, ambient temperature, pollution, concentration of a given gas (e.g. $CO_2$), etc. Data from these environmental sensors can help to interpret data coming from the other sensor(s) so that a more accurate determination can be made as to what behaviour the animal is currently exhibiting.

Furthermore, the system may be configured to use a control protocol which selects different sounds for output (or inhibits sound production) dependent on one or more properties of the environment at the time of detection of an event (e.g. different sounds may be output in response to a given category of event dependent on whether it is night (low measured light levels) or day (high measured light levels)).

In general, the sensors 3 are set up to operate continuously so that the animal's behaviour is monitored without interruption; this ensures that an interesting animal call or behaviour is not missed. However, the present invention is not limited to such an arrangement. For example, the sensors may be arranged so as to perform measurements at a selected measurement interval set sufficiently small that no interesting behaviour will, in practice, be missed. Another example variant consists in having a first sensor operate continuously (or at a selected measurement frequency) while the other sensor(s) are in a standby mode that switches to an active monitoring mode when the output signal from the first sensor indicates that something interesting is happening (e.g. the animal has started to move about, the animal has begun to make a new sound, etc.). Yet another example variant consists in the measurement frequency of the sensors being increased when the system determines that something interesting has started to happen.

Likewise, the invention is not particularly limited with regard to the nature of the sound output device 7. Any convenient sound output device can be used that is appropriate to the environment in which the animal is located (e.g. loudspeakers, underwater acoustic transducers such as piezoelectric transducers, etc.) and the desired properties (e.g. pitch) of the output sound.

Once again there is considerable flexibility in the nature of the connections between the sensors 3 and the computer system 5, as well as for the connections between the computer system 5 and the sound output device 7. FIG. 1 illustrates wired connections, but the invention is not limited to this case: wireless connections may be used, connection may be made via intermediate devices (e.g. amplifiers, data-logging devices), etc.

The signal processing involved in the animal-machine audio interaction system illustrated in FIG. 1 is performed using a general purpose computer system 5 which includes a processing module 10 (see FIG. 2) that has been programmed in a particular manner. However, the invention is not limited to such an arrangement. For example, one variant consists in using a combination of application-specific hardware and software to achieve the signal required processing.

Figure 2:
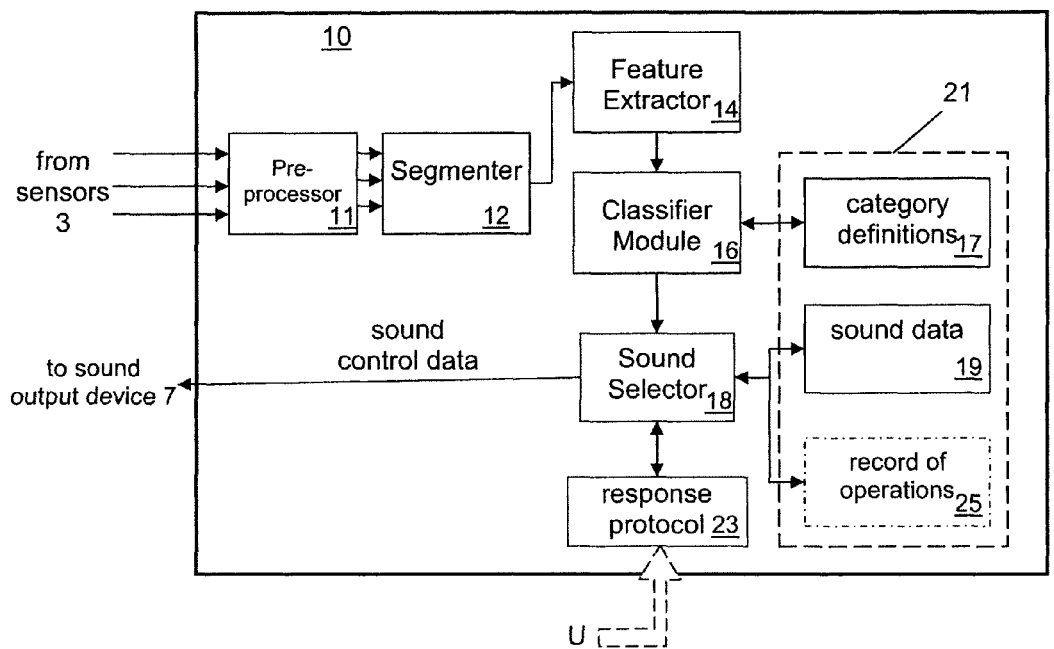
FIG. 2 is a block diagram illustrating one example of processing modules that may be used in an animal-machine audio interaction system according to the embodiment of FIG. 1.

FIG. 2 is a block diagram illustrating an example of a combination of processing components that can be used for implementing the processing module 10 used in the animal-machine audio interaction system illustrated in FIG. 1. It is to be understood that, in practice, the illustrated processing module 10 will usually be implemented in software; the different components shown in FIG. 2 are identified merely to aid understanding of the various functions that are performed by the processing module 10. Moreover, the distribution of functions between the various components shown in FIG. 2 could be changed and/or these functions could be performed using a lesser or greater number of elements than that shown in FIG. 1.

As illustrated in FIG. 2, the processing module 10 (which may be a general-purpose processor included in the computer system 5 of FIG. 1) is programmed or otherwise configured to include a pre-processing unit 11 which receives the signals output by the set of sensors 3 and is configured to apply any necessary pre-processing to each type of sensor output signal, according to its type. The pre-processing unit 11 is arranged to supply the pre-processed sensor signals to a segmenter 12 which is configured to further process these signals to identify meaningful portions that can be isolated and considered to be individual samples (i.e. meaningful individual "events", which could be an animal cry, song or call or, more generally, a particular behaviour). Depending on the application it may be appropriate to omit the pre-processor 11 or to integrate it into the segmenter 12.

As shown in FIG. 2, the segmenter 12 is arranged to output sensor data relating to an individual event to a feature extractor 14. The feature extractor 14 is configured to process the received sensor data in order to define a set of one or more features which describe the detected "event". The feature extractor 14 is arranged to output data defining this set of features to a classifier module 16. The classifier module 16 is configured to classify the detected event in one of a plurality of predefined categories, based on the feature data received from the feature extractor 14. The category definitions are stored, typically, in a memory 17 that is also internal to the processing module 10. The classifier module 16 is arranged to output, to a sound selector 18, data defining a category that has been assigned to the detected event. The sound selector 18 is configured to select a sound to be played to the monitored animal(s), based on a predefined response protocol. Typically, data defining the available sounds is stored in a memory 19 that is also internal to the processing module 10. Typically, data defining one or more response protocols is stored in a memory 23 internal to the processing module 10. The processing module 10 may be configured to allow a user to control which response protocol is used by the sound selector 18 at a given time (this is indicated by the dashed arrow U in FIG. 2). Likewise. the processing module 10 may be configured to allow the user to update the control protocols, for example by modifying an existing protocol or by adding a new control protocol.

A common memory 21 may be used to store the category definitions and the sound data. The response protocol(s) may also be stored in such a common memory 21. As another alternative, the response protocol(s) may be integrated into the sound selector 18. It is convenient for the category definitions, sound data and response protocols to be held in storage devices internal to the processing module 10 as illustrated in FIG. 2. However, the invention is not limited to this arrangement: certain embodiments of the invention may access one or more of these items from a location outside the processing module 10 (e.g. from a recording medium or storage device external to the processing module 10, from a remote location via a network, etc.)

As shown in FIG. 2, the sound selector 18 is configured to output sound control data to the sound output device 7 of FIG. 1 so as to control the sound output device 7 to play the selected sound to the monitored animal(s) A. Optionally, the sound selector 18 may be configured to cause a record 25 to be kept of the category assigned to a detected event and of the sound that was output in response to this category. This record may be enriched with other information regarding the operational history of the system, for example, logging details of any sustained interactions between the system and an animal (or group of animals), for example including information regarding the number of detected events and output response sounds in a given sustained interaction, the nature of the response protocol used during the sustained interaction, etc.

Typically, the processing module 10 will be programmed differently based on the species of animal(s) being monitored (specifically, the segmenter, the feature extractor, the classifier and the output sounds are liable to require adaptation dependent the species of animal being monitored and, in some case, dependent on the particular individual(s) of a species that is(are) being monitored). However, the same kinds of sensor devices and sound-output devices are liable to be useable for many different kinds of animal species.

More detail will now be given regarding the functions performed by certain modules illustrated in FIG. 2.

Segmenter

The nature and operation of the segmenter 12 can vary widely depending on the application and, in particular, on the number and nature of the sensors 3.

In a simple case, where the set of sensors 3 includes only a single audio sensor 3A, the segmenter may employ well-known techniques (e.g. techniques known from the field of voice recognition and the like) in order to identify, within the output signal stream produced by the audio sensor 3A, segments which can be considered to correspond to separate sounds. One example of a suitable segmentation technique is an analysis of the energy variations (i.e. the maxima and minima) of the short-term spectrum of the measured sound signal. However, the invention is not limited to use of this particular technique. The skilled person will readily appreciate that other sound segmentation techniques—onset detection techniques, correlation techniques, Hidden Markov Model-based techniques, and so on—may be used.

In cases where it is desired to respond only to sounds that are meaningful to animals of the same species as the animal(s) being monitored, it can be advantageous to pre-process the measured sound signal, before analysis by the segmenter 12, using a filter bank which is configured to mimic the frequency resolution and frequency response of the ear of an animal of this species. Such a filter bank can be integrated in the pre-processor 11 illustrated in FIG. 2.

In the general case, the segmenter 12 receives a set of two or more signal streams as its input and seeks to find time intervals where the set of sensor signals indicates that a meaningful "event" is taking place, for example, the monitored animal(s) is(are) exhibiting a particular type of behaviour. It may be considered that each signal-stream processed by the segmenter 12 constitutes a separate channel.

This general case occurs, typically, when the set of sensors 3 includes other types of sensors in addition to an audio sensor 3A. However, it also covers the case where multiple audio sensors 3A are used, arranged around a region containing the animal(s) to be monitored, so as to ensure that all relevant sounds are captured. In such a case, the segmenter 12 may be configured to process the output signal from each audio sensor as a separate channel, but other arrangements are possible: for example, the segmenter 12 may be configured to process only the strongest audio signal received by the set of audio sensors. More generally, if multiples of a given type of sensor are arranged around the detection region in order to ensure that all interesting data of a given type is captured, the segmenter 12 may process data from each such sensor as a separate channel, process merely the strongest output, average the outputs from the sensors of the same type, etc.

FIG. 3 is a diagram to illustrate the nature of the function performed by the segmenter 12 in a case where three sensors provide streams of signals to the interaction system 1 (i.e. there are 3 channels) and the segmenter is configured to detect events based on signals from all the channels. FIG. 3A shows how signals from three sensors (designated sensor a, sensor b and sensor c) might vary over a particular time period. In this example it will be seen that the signal from sensor a has periods of relative inactivity interspersed with bursts of activity, the signal from sensor b varies relatively slowly between a higher level and a lower level, and the signal from sensor c has a variation which appears approximately random.

The segmenter 12 operates to identify, from the sensor signal streams, time periods during which an event of interest may be occurring. FIG. 3B illustrates one possible segmentation of the sensor signal streams illustrated in FIG. 3A. As shown in FIG. 3B, the segmenter 12 has identified three "events": event 1 occurs from time t1 to time t2, event 2 occurs from time t3 to time t4 and event 3 occurs from time t5 to time t6. In this example, the identified "events" correspond to time periods during which there are bursts of activity in the signal from sensor a and the signal from sensor b is at a relatively low level.

A variety of techniques may be used to identify "events" within a set of two or more sensor-signals streams. One approach consists in measuring the degree of coordination there is between the signals from the different sensors, notably as described in EP-A-1 916 828. However, other techniques may be used. For example, the segmenter 12 may be configured so as to base the segmentation entirely or primarily on the variations observed in signals on a predetermined one of the channels (or a set of the channels). Indeed, in many applications, the segmentation will be based solely (or primarily) on input from the audio sensor(s). As another example, the segmenter 12 may be configured to segment each channel separately and, afterwards, "events" can be identified in different ways, one of which is to compare the timing of the "events" identified for the different channels (for example, in order to determine a set of time periods when all the channels (or a sub-set of the channels) are considered to have "events", to determine a channel in which events are identified with a high degree of confidence, etc.).

When the segmenter 12 has identified an "event" in the sensor signals, it provides the feature extractor 14 with data identifying the relevant portion of the sensor signal(s) that corresponds to that event.

Typically, the segmenter 12 will forward to the feature extractor 14 the actual sensor-signal data that corresponds to the identified event. For example, in the case illustrated in FIG. 3B, in respect of event 1 the segmenter 12 may forward to the feature extractor 14 the portions of the signals from sensors a, b and c which run from t1 to t2. This may be achieved by transferring the relevant analogue signal segments illustrated in FIG. 3C to the feature extractor 14 in parallel (or in series), or by transferring the signal-segment data to the feature extractor in the form of a block of digital data, for example as illustrated in FIG. 3D.

However, in configurations where the (optionally pre-processed) sensor signals are supplied directly both to the segmenter 12 and to the feature extractor 14, it is sufficient for the segmenter 12 to notify the feature extractor 14 of which portions of the sensor output signals correspond to a given event, without transferring the sensor-signal segments themselves.

The segmenter 12 can be configured so that, over a time interval T it collects sensor-signal data and, at the end of interval T, it analyzes the collected sensor-signal data so as to detect any "events" occurring within time interval T.

Alternatively, in some embodiments of the invention, the segmenter 12 is configured to monitor the incoming sensor-signal streams on a continuous basis, looking for a moment when the sensor signals indicate the potential beginning of an event. In such embodiments, when the segmenter 12 judges that the set of sensor signals is consistent with the start of an event, it begins to record the sensor-signal data and to analyse it to confirm whether or not an event is occurring, as well as to detect the end of the event. The advantage of such embodiments is that they reduce the amount of data that needs to be stored, as well as reducing the delay between the occurrence of an event and the detection of the event.

Feature Extractor

For convenience, the set of sensor-signal segments that corresponds to a given event shall be designated here as "event data". The feature extractor 14 is configured to produce a set of "features", that is descriptors, of the pre-processed sensor output signals that correspond to a given event identified by the segmenter 12. Generally, a "feature" consists of an attribute and a corresponding value for this attribute. For example a feature defining the average pitch of an audio signal segment corresponding to an event could consist of the attribute <average pitch> and the value data: <28.4 kHz>. Although the "value" will often be numerical, this is not essential; for example, it may be an item selected within a list of possibilities, or a Boolean variable indicating whether the associated attribute is true or false for the event in question.

Typically, features will be generated separately for the different channels (sensor outputs), but the invention covers the case of composite features which are derived from processing together the output signals from two or more sensors (including sensors of different kinds).

In the case of audio sensor outputs, typical features that may be calculated for a segment ("event") include:
- the pitch of the audio segment as evaluated during the "sustain" portion of the sound signal waveform (derived by determining the most prominent peak in the Fourier transform),
- the energy of the audio segment,
- the "noisiness" of the segment (e.g. found by computing spectral flatness),
- the "percussivity" (found, for example, by analyzing the energy of the attack portion of the waveform),
- the "timbre" of the sound (for example, modelled by its Mel Frequency Cepstrum Coefficients),
- the frequency bandwidth of the audio segment,
- the duration of the audio segment,
- the zero crossing rate, and others.

Alternatively (or additionally), the features or "acoustic descriptors" may be combinations of low-level features defined in the Mpeg-7 standard (as is well-known in audio classification applications).

In the case of video camera outputs, typical features that may be calculated for a segment include: histogram information (so-called "image moments"), correlation, texture, and so on.

In the case of outputs from phyiological sensors, which are typically mono-dimensional, typical features that may be extracted include: statistical parameters of the measured attribute during the event period (e.g. mean, variance, kurtosis, etc.)

In the case of outputs from movement detectors, typical features that may be extracted tend to be the same as for video camera data.

In general, the feature extractor 14 is configured to seek to describe each event using features taken from a predetermined set, notably the features that were used to define event "categories" during a preliminary training phase. When the feature extractor 14 has determined the set of features that describes a given event, it supplies the feature data to the classifier module 16 so that the classifier module 16 can evaluate whether the current event falls into one of the known categories.

Aspects of the feature-extraction and classification functions that are performed during use of the audio interaction system 1 should become clearer from the following description of operations that are performed during the training phase (which is implemented, prior to use of the system, in order to establish the categories that may be assigned to detected events during the use phase).

When designing an audio interaction system embodying the present invention it is necessary to develop a classification model, that is, a set of definitions of categories which may be assigned to the events which the system is liable to detect during subsequent operation. The classification model may consist of explicit data defining features which characterize different categories or it may be implicit in the structure of a trained classifier (e.g. in a discrimination tree, or a trained neural network). In general, the categories will depend on the intended application of the interaction system, notably, on the species of animal to be monitored and on the kinds of behaviour that this species of animal may display. The animal species may also have an impact on which technique is most appropriate for use when segmenting the sensor signals.

During the training phase, a set of one or more animals is monitored using a set of sensors comparable to the set of sensors 3 of the audio interaction system 1. This may be the actual set of sensors included in the audio interaction system 1 that is to be used subsequently or, more usually, it is a different set of physical sensors that matches the set of sensors 3 of the audio interaction system 1.

During the training phase, at the same time as the sensor-signal data is collected human observations are made so as to determine the respective behaviours that the monitored animal(s) was(were) displaying at different times. Thus, for example, a human observer (or, for greater reliability, a set of human observers) may decide that during time periods from ti to tj, tk to tl and tm to to within the training phase, a monitored animal was emitting a call of a first type (which indicates fear), during time periods from tp to tq, and tr to is the animal was striking a bell, and during time periods from tt to tu, tv to tw and tx to ty the animal was emitting a call of a second type (which indicates contentment). In effect, the human observer classifies the animal behaviour he has observed during the training phase into different categories which are meaningful to him and which, usually, he will wish the audio interaction system 1 to be capable of recognizing during the use phase. In the foregoing example, the user-defined information indicates that 8 "events" of 3 different categories occurred during the training phase.

The measured sensor signals are processed, in association with the user-defined information regarding the timing and category of the events which occurred during the training phase, in order to develop a classification model appropriate for application during the use phase of the audio interaction system. The processing performed in order to develop the classification model may be implemented using components of the processing module 10 of the audio interaction system 1 that will be employed during the use phase. However, more usually, the classification model is developed using other processing apparatus and, after the classification model is developed, the details thereof—feature sets and categories— are supplied to the processing module 10 of the audio interaction system 1 that will be employed during the use phase.

A wide variety of different machine learning techniques may be used to develop the classification model from the measured sensor signals and the user-supplied category and timing information. The skilled person will readily recognize that the measured sensor signals and the associated user-defined categories serve as training data that is used to train one or more classifiers in a supervised learning process. The training process involves an explicit or implicit analysis of the features of the sensor signals relating to events of different (known) categories, in order to determine the features which serve to differentiate instances of one category from instances of other categories.

Any convenient supervised learning technique may be used to train a classifier in the training phase. Supervised learning techniques are well-known, and have been used to train a classifier for classification of dolphin vocalizations (see Kremliovsky et al, "Characterization of dolphin acoustic echo-location data using a dynamical classification method" in Int. J. Bifurcat Chaos, 8, pages 813-832 (1998)). Accordingly, it is unnecessary to describe those techniques in detail here. However, it is appropriate to make a number of remarks so as to indicate, explicitly, certain variations which are encompassed by the present invention.

The machine learning process may involve evaluation, for each event, of the values of a predetermined set of attributes (e.g. values for: the number of harmonics, the frequency bandwidth, the amplitude, the duration, the zero crossing rate, etc. of sound sensor signals defining an event), followed by processing of the resultant feature sets for the different events in order to determine which of these features (or combinations of these features) best serves to differentiate instances of the different categories from instances of the other categories. The latter processing may implement any convenient approach including, but not limited to, discriminant factorial analysis (DFA) and principal components analysis (PCA) in order to determine which features best serve to differentiate instances of different categories from each other.

Alternatively, the machine learning process may itself determine, automatically, attributes of the sensor signals which can be quantified so as to produce features which differentiate instances of different categories from one another. In other words, the machine learning algorithm may include a feature generation component.

One convenient approach for feature-generation in relation to classification of animal sounds consists in use of the EDS audio signal processing system (as described in "Classification of dog barks: a machine learning approach" op cit, where dog barks were classified into one of seven categories). More particularly, the EDS audio signal processing system may be used to generate features corresponding to certain basic mathematical operations performed on a waveform representation of the audio signal, and then to develop more complicated descriptors, in an evolutionary process, by combining the basic operators. During the learning phase, this EDS audio processing system can be used to generate descriptors relating to a set of training examples which have already been classified. An analysis is then performed (e.g. by PCA, DFA, etc.) in order to determine which of the generated descriptors (features), or combinations thereof, best enable the training examples to be correctly classified.

The training phase yields a trained classifier (for example, a discrimination tree, a trained neural network, an explicit list of feature sets and associated categories, etc.) which can be replicated in the processing module of the audio interaction system 1 (for example, by suitable processing of the classifier module 16 and category definitions 17 illustrated in FIG. 2).

Often the audio interaction system according to the invention will be configured in such a way that it is capable of identifying an event of a kind that is not meaningful or interesting in the application in question. For example, in the case of an interaction system 1 whose only sensor is an audio sensor 3A, some of the sounds that may be detected may correspond to animal behaviours which are not of interest in the particular application. Consider the case of an audio interaction system 1 which is designed to respond to vocalizations made by a monitored animal: in such a context it is undesirable for the system to respond to detected sounds which are not vocalizations (e.g. to sounds made when the animal is digging, moving around, etc.). Accordingly, it is helpful if the classification model can distinguish between events which are of interest and events which are not of interest in the application in question. This can be achieved in different ways.

During the training phase, the classifier can be trained with the aim of assigning a particular category (or set of categories) to instances of events which, in the intended future application, are "uninteresting". The sound selector 18 in the audio interaction system 1 will then be provided with a response protocol which indicates that, for detected events in categories which correspond to "uninteresting" events, no sound should be output.

If it is known, ab initio, that certain types of event will never be of interest when the audio interaction system 1 is in use in a given application then it does not matter if, during the training phase, the classifier is trained so as to assign instances of all these types of event to the same category, i.e. it does not matter if the classifier cannot distinguish between different types of "uninteresting" events.

However, there may be applications in which it is desirable to allow the user to have some control over the types of events which trigger audio output from the system. In other words, in some applications it is desirable to allow a dynamic definition of which events are "uninteresting".

For example, in the case of an interaction system 1 designed as a tool for investigating the sounds made by parrots, the user may wish, during a first time period, for the system to respond only to speech-type sounds made by the parrot whereas, during a second time period, the user may wish the system not to respond to speech-type sounds but to respond only to "beatbox-type" sounds made by the parrot. This functionality is achieved by providing the interaction system 1 with a user interface (not shown) which enables the user to designate one or more specified event categories as "uninteresting" (i.e. as categories for which no output sound should be selected and generated) and to change this designation at will.

In applications of the latter type, it is advisable to train the classifier during the training phase so that it is capable of differentiating between different types of event that may, subsequently, be designated as "uninteresting" (e.g. to be able to differentiate between "speech-type" sounds and "beatbox-type" sounds made by parrots). Thus, in the training phase the classifier should be trained to assign different categories to these different types of event.

The training phase may also be used to determine which segmenting technique should be used for identifying "events" within the sensor-signal streams. This can be done by comparing the user-defined timing attributed to "events" that occur during the training phase and a calculated timing determined by a segmenter working on the sensor signals measured during the training phase. Multiple different automatic segmentation techniques can be applied to the sensor signals that are measured during the training phase, and a judgement can be made (automatically or by the user) as to which of these automatic segmentation techniques yields timings which best match those assigned by the human user. The segmenter 12 can then be configured to make use—in the operational phase subsequent to the training phase—of the segmentation technique that yielded the best match.

Output Sound Selector

The present invention is not particularly limited with regard to the kind of sound that may be output by the audio interaction system 1. In general, the output sounds available for selection by the sound selector 18 depend on the application of the audio interaction system 1.

Thus, for example, in applications where it is desired to set up a sustained interaction with one or more animals it is advantageous for the output sound to resemble sounds made by animals of the kind being monitored. Accordingly, the sound selector may be configured to control the sound output device so that it generates sounds which have the same acoustic properties as sounds made by animals of the kind being monitored. The selected audio response can be a synthesized sound. However, it is particularly advantageous if the output sounds correspond to recordings of actual sounds made by animals of the same type as that(those) being monitored.

As illustrated in FIG. 2, the sound selector 18 may obtain data defining the output sound from a memory 19. The stored data may consist in control data required to control the sound output device 7 so that it generates a sound having desired characteristics. However, this is not essential; the stored data may be data for interpretation by the sound selector 18 which itself generates the necessary output signal for controlling the sound output device 7.

Response Protocols

As indicated above, on the occurrence of a detected event the sound selector 18 selects a sound for output by the audio interaction system 1 on the basis of a control protocol including a response protocol which defines the type of sound that should be output in different circumstances taking into account the categories of one or more detected events. The invention is not particularly limited with regard to the nature of the response protocol. In general, the nature of the response protocol depends on the application of the audio interaction system 1. However, some general remarks can be made.

Different functionality can be achieved by appropriate design of the response protocol(s). Consider embodiments of the invention in which the event categories are defined so as to differentiate between behaviours exhibited by different individuals within a group of monitored animals. For example, consider an embodiment which monitors animal sounds only (i.e. the only sensor is an audio sensor 3A), and in which respective different categories are defined corresponding to instances when sounds are made by different individual animals. In such an embodiment a response protocol can be defined so that the output sound varies dependent on "who has spoken".

One type of response protocol includes an explicit definition of the precise sound to be output for each category of detected event (e.g. "for event category A, output sound data with ID=PQR", "for event category B, output sound data with ID=XYZ", etc.). Such a response protocol may be defined using any convenient technique, for example, via a look-up table.

Another type of response protocol defines the output sounds in an indirect manner, so that the output sound has a specific relationship with sound which accompanied the detected event. An example of this type of response protocol is one which controls the sound selector to select an output sound which mimics animal sound that occurred during the detected event. The mimicking sound may be a sound of the same type as the sound which occurred during the detected event (but recorded on an earlier occasion), or it may be playback of the actual sound data measured during the detected event, a synthesized version of either of these, etc.

Yet another type of response protocol is arranged to control the sound selector in an adaptive manner so that it selects an output sound dependent on historical data that has been recorded in the memory 25 during prior operation of the audio interaction system 1. For example, the historical data may indicate that, in the past, when the system output a sound of a given type in response to a detected event of a particular category this resulted in an undesirable result (e.g. the next detected event corresponded to an undesired behaviour of the monitored animal(s); or no subsequent events were detected for a considerable period of time, perhaps indicating that the monitored animal(s) stopped interacting with the system). In such a case, the adaptive response protocol may direct the sound selector 18 to avoid selecting, in response to detection of an event in this particular category, the output sound which resulted in the undesirable result in the past.

Device history is also taken into account in response protocols which define the output sound in dependence on the categories that have been assigned to a sequence of two or more detected events (e.g. the last n events, where n is a an integer).

Moreover, as indicated above, a given response protocol may define different scenarios and indicate how the output sound is to be chosen, in each case, if one of these different scenarios comes to pass.

Often it is desirable to configure the audio interaction system 1 such that a plurality of response protocols are available for controlling the selection made by the sound selector 18 (e.g. data defining a plurality of different response protocols are stored in the memory 23). In such a case, the operation of the sound selector 18 may be controlled at a given moment dependent on a particular response protocol which has been selected for use at this time by some user action (via a user interface, not shown). Alternatively, the sound selector 18 can be configured to make its own choice of which response protocol to apply at any given time, for example, based on random choice, based on historical data regarding what has happened during prior operation of the system, or based on some other criterion. In case where the sound selector 18 makes an automatic choice of which response protocol to use at a given time, this choice may be guided by a pre-programmed directing principle, for example, select a response protocol with the aim of encouraging a sustained interaction which includes the greatest possible number of detected events and responses.

The utility of the present invention may be better understood from the following description of an example implementation thereof as a scientific tool.

Example Implementation—Scientific Tool

An example of an interaction system according to the present invention, configured as a scientific tool for the investigation of the behaviour of canaries, will now be described. This scientific tool consisted generally of the modules illustrated in FIGS. 1 and 2 except that there was only one sensor, an audio sensor 3A.

A training phase was implemented investigating the calls made by a group of female canaries. Analysis of the canary calls during the training phase indicated that the calls could be classified into two categories—type A and type B—based on their acoustic properties. The feature extractor 14 of the interaction system was programmed with details of certain acoustic features that it should attempt to evaluate for future canary calls detected by the sensor 3A and segmenter 12 (notably the features which served to differentiate between the type A and type B canary calls during the training phase). The classifier module 16 of the interaction system was programmed with details of which acoustic features describe the two categories of canary calls. The memory 19 was supplied with sound data corresponding to recorded canary calls of type A and type B, as well as with synthesized sounds corresponding to canary calls of type A and B.

The memory 23 was supplied with control data defining four different response protocols:

the first response protocol caused the sound selector 18 to operate the interaction system in a "natural replication mode" (i.e. output of a recorded type A canary call in response to detection of a type A canary call, and output of a recorded type B canary call in response to detection of a type B canary call), the second response protocol caused the sound selector 18 to operate in an "natural inverting mode" (i.e. output of a recorded type B canary call in response to detection of a type A canary call, and output of a recorded type A canary call in response to detection of a type B canary call), the third response protocol caused the sound selector 18 to operate the interaction system in an "artificial replication mode" (i.e. output of the same type of canary call to the detected call, but using a synthesized output sound instead of outputting a recorded natural call), the fourth response protocol caused the sound selector 18 to operate in an "artificial inverting mode" (i.e. output of the opposite type of call to the detected call, but using a synthesized output sound instead of outputting a recorded natural call), In this example, the audio interaction system 1 was configured as a scientific tool to investigate the calling behaviour of the same group of female canaries as had been used during the training phase. It was found that, when the interaction system operated using the first response protocol (i.e. the system would respond to a canary call by outputting a recorded call of the same type) the canaries would tend to produce more sounds, so that a sustained interaction was built up between the birds and the system. On the other hand, when the interaction system operated using the second control protocol (i.e. the system would respond to a canary call by outputting a recorded call of the opposite type), the canaries would stop producing sounds. Also, when the interaction system operated using either of the third or fourth control protocols (responding to detected canary calls using synthesized output sounds), the canaries would tend to stop producing sounds.

It will be seen that, in the above example application, an audio interaction system according to the invention constituted a useful scientific tool which allowed the behaviour of monitored animals to be investigated.

Moreover, in the above example application, it was found that the system could identify the individual canary which had emitted the detected sound. This makes it possible to tailor the output sound to the particular individual that has emitted a call.

The physical equipment making up an audio interaction system according to the present invention can be arranged in a variety of ways, adapted to the application.

Figure 4A:
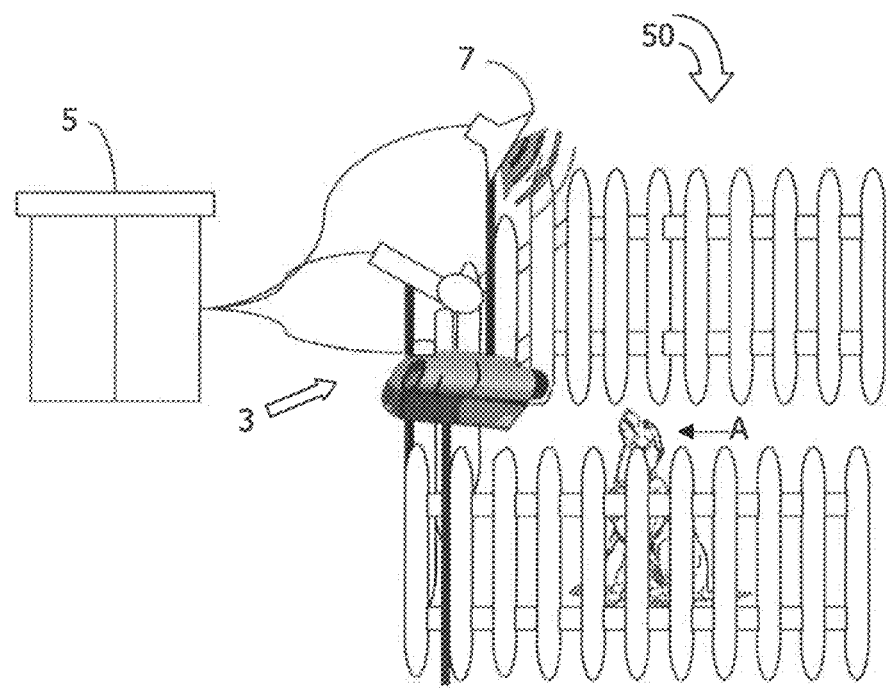
FIG. 4A illustrates an example of a fixed system designed to interact with an animal located in an enclosed area.

For example, as illustrated in FIG. 4A, in a case where the animal(s) to be monitored is(are) located within an enclosed area 50, some or all of the sensors 3 may be set up at fixed locations, for example on poles attached to a fence defining the enclosure. Similarly, the sound output device 7 may be set up at a fixed location relative to the enclosure, so as to broadcast into the enclosure 50. Typically, the computer apparatus 5 or other processing equipment providing the functions of the processing module 10 will be located in a cabinet outside the monitored enclosure (so as to reduce the risk of damage).

Figure 4B:
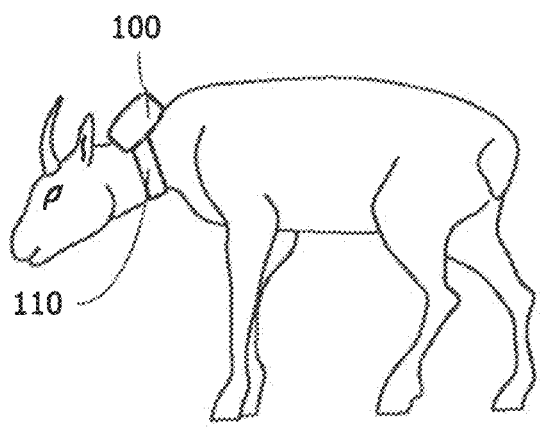
FIG. 4B is an example of a mobile (or portable) system, designed to interact with an animal that is free to roam.

In a different arrangement, illustrated in FIG. 4B, the audio interaction system is miniaturized and mounted in a portable housing 100 which can be attached (by a strap 110, or other convenient mounting accessory) to an animal. An arrangement of this type is suited to applications where the animal(s) to be monitored is(are) free to roam.

Other arrangements are also possible. Sensors measuring physiological properties of an animal will, in general, be mounted on the animal, even in an application where the animal(s) to be monitored is(are) located within an enclosure. However, other types of sensor (e.g. a microphone) could equally be carried by an animal within the enclosure. As another alternative, the whole of the system equipment may be integrated into a single apparatus which is positioned in proximity to the animal(s) to be monitored (e.g. next to a birdcage).

Although the present invention has been described above with reference to a number of specific embodiments thereof, the skilled person will readily understand that the invention is not limited by the detailed features of those specific embodiments and, in particular, various modifications and developments may be made while still resting within the scope of the invention as defined in the appended claims.

For example, the specific embodiments relate to audio interaction systems which produce an audio response in response to detection of events (sounds, behaviours) in specified categories. However, it is not essential for such systems to be in a responsive state at all times, that is, the interaction system may be configured so as to have certain unresponsive phases during which no sound is output even when an event in a suitable category is detected. The unresponsive periods may be set to occur at random time intervals, at time intervals set by the user, at intervals set according to a predefined pattern, etc. During such unresponsive periods, system circuitry may be placed in a standby state to save energy.

In addition, in the above-described embodiments the detected events (sounds, etc.) are classified by analysis of the respective feature sets that describe each event. However, the classification could be implemented using other techniques that compare detected events to pre-studied events in different known categories. For example, the classification may be performed by comparing the spectrogram of a detected sound to spectrograms of reference sound samples which correspond to respective different known categories.

The invention claimed is:

1. An animal-machine audio interaction system comprising:
   a set of one or more sensors configured to monitor one or more animals, said set of sensors including an audio sensor;
   a segmenter configured to process a set of one or more respective signal streams output by the set of sensors to detect events;
   an analyzer configured to analyze the signal streams corresponding to respective events identified by the segmenter, to assign a respective category to said events and to identify at least one class of event for which no audio output is desired;
   an output sound selector configured to select an output sound to be generated upon detection of an event, said selection taking into account one or more categories assigned by the analyzer to one or more respective detected events; and
   a sound output unit configured to output the selected output sound.

2. The animal-machine audio interaction system according to claim 1, wherein the output sound selector selects the output sound based on a species of the one or more animals being monitored.

3. The animal-machine audio interaction system according to claim 1, wherein the output sound selector selects a recorded animal sound for output.

4. The animal-machine audio interaction system according to claim 1, wherein the analyzer inhibits generation of an output sound in response to detection of events of said at least one class.

5. The animal-machine audio interaction system according to claim 1, further comprising:
   a history-logging unit configured to register interactions between the animal-machine audio interaction system and the one or more animals by registering sequences of events detected by the segmenter and corresponding sounds selected by the output sound selector for output.

6. The animal-machine audio interaction system according to claim 5, wherein the output sound selector, when selecting an output sound for a given event, takes into account prior interactions registered by the history-logging unit.

7. The animal-machine audio interaction system according to claim 1, wherein said animal-machine audio interaction system is implemented in a portable device.

8. The animal-machine audio interaction system according to claim 7, wherein said portable device is mounted on an animal.

9. A method of controlling audio interaction between one or more animals and a machine, the audio interaction control method including the steps of:
   monitoring one or more animals using a set of one or more sensors having an audio sensor;
   processing a set of signal streams output by the set of sensors to detect events;
   analyzing the signal streams corresponding to the detected events, assigning a respective category to said events and identifying at least one class of event for which no audio output is desired;
   selecting an output sound to be generated upon detection of an event, said selecting taking into account one or more categories assigned to one or more respective events; and
   outputting the selected sound.

10. The animal-machine audio interaction controlling method according to claim 9, wherein the selecting step further includes selecting an output sound based on a species of the one or more animals being monitored.

11. The animal-machine audio interaction controlling method according to claim 9, wherein the selecting step further includes selecting a recorded animal sound for output.

12. The animal-machine audio interaction controlling method according to claim 9, wherein the analyzing step further includes inhibiting generation of an output sound in response to detection of events of said at least one class.

13. The animal-machine audio interaction controlling method according to claim 9, further comprising:
   registering interactions between the machine and the one or more animals by registering sequences of the detected events and corresponding selected sounds selected for outputting.

14. The animal-machine audio interaction controlling method according to claim 13, wherein the selecting step further includes taking into account previously registered interactions when selecting an output sound with respect to a given event.

15. A non-transitory computer-readable medium storing computer readable instructions thereon which when executed by a computer cause the computer to perform a method comprising:
   monitoring one or more animals using a set of one or more sensors having an audio sensor;
   processing a set of signal streams output by the set of sensors to detect events;
   analyzing the signal streams corresponding to the detected events, assigning a respective category to said events and identifying at least one class of event for which no audio output is desired;
   selecting an output sound to be generated upon detection of an event, said selecting taking into account one or more categories assigned to one or more respective events; and outputting the selected sound.

* * * * *